May 12, 1936. W. R. GRISWOLD 2,040,435
VALVE SPRING
Filed March 5, 1934
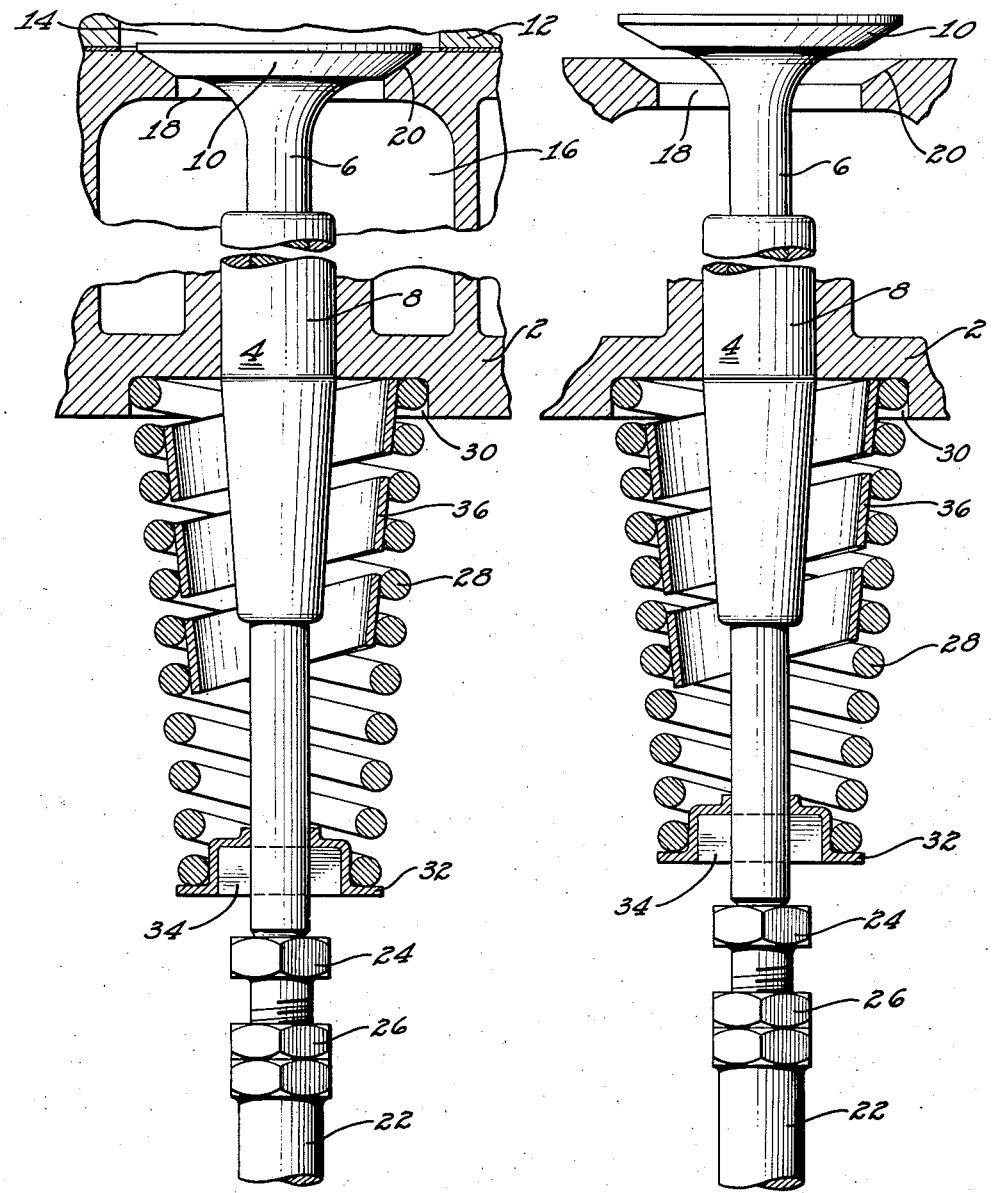
Inventor
WALTER R. GRISWOLD.
By Milton Tibbetts
Attorney Patented May 12, 1936

2,040,435

UNITED STATES PATENT OFFICE 2,040,435

VALVE SPRING

Walter R. Griswold, Detroit, Mich., assignor to Packard Motor Car Company, Detroit, Mich., a corporation of Michigan Application March 5, 1934, Serial No. 714,007

2 Claims. (Cl. 267—1)

This invention relates to spring operated mechanisms in which the springs are compressed and expanded repeatedly at high speed as in the valve mechanism of an internal combustion engine and more particularly to damping means for damping the surges of the springs of such mechanisms.

The invention is illustrated in this application as embodied in a poppet valve mechanism for internal combustion engines. It is to be understood, however, that the invention is not limited to such mechanism but that it may be embodied in other mechanisms in which a coiled spring is compressed and expanded repeatedly at high speeds.

The poppet valves of internal combustion engines, in the usual construction, are closed by coiled springs and are opened by a cam shaft operated from the crankshaft of the engine. These valve operating springs develop vibrations or surges at high engine speeds which interfere with the proper timing of the valves and often cause the coils of the spring to strike against each other making a great deal of noise. These surges also place relatively heavy stresses on the springs and frequently cause them to break or to become fatigued prematurely. To prevent these surges of the valve operating springs, various mechanisms have been produced.

The principal objects of the present invention are to improve the construction and mode of operation of damping devices for springs operated at high speeds and to produce a damping mechanism for such springs which is simple in construction and reliable in operation which will operate quietly at all times and which is not particularly subject to wear or deterioration.

With the above and other objects in view, the invention consists in a construction embodying the novel and improved features hereinafter described and particularly pointed out in the claims the advantages of which will be readily understood by those skilled in the art.

The features of the invention will be clearly understood from the accompanying drawing illustrating the invention in its preferred form and the following detailed description of the constructions therein shown.

In the drawing, Fig. 1 is a sectional view of a portion of an internal combustion engine illustrating a valve mechanism embodying the present invention, the section being taken in a plane containing the axis of the valve and showing the valve in closed position;

Fig. 2 is a view similar to Fig. 1 showing the valve in open position.

In the construction illustrated in the drawing, the cylinder block of an internal combustion engine is indicated at 2. Associated with the cylinder block is a reciprocating poppet valve indicated as a whole at 4. This valve comprises a valve stem 6 arranged to reciprocate in a bearing sleeve 8 fitted into a suitable opening in the cylinder block and a valve head 10 secured to one end of the valve stem.

To the cylinder block is secured a head block 12 within which is a combustion chamber 14. A fuel inlet or exhaust outlet manifold 16 is connected with the combustion chamber by means of a port 18 having a beveled face 20 arranged to be engaged by a correspondingly beveled face on the valve head 10.

Associated with the end of the valve stem opposite the valve head is a tappet 22 provided with an adjustable contact member 24 at the end thereof for engagement with the adjacent end of the valve stem and with a lock member 26 for securing the contact member in adjusted position. The valve tappet is reciprocated axially in the conventional manner by an engine operated rotating element. The movement of the tappet in a direction toward the valve seat will move the valve head away from the valve seat to allow communication between the manifold 16 and the combustion chamber 14.

The valve is returned from open to closed position by means of a coiled spring 28 surrounding the valve stem. One end of this spring is seated in a recess 30 in the cylinder block and the other end engages a peripheral flange on a cup-shaped retainer 32 mounted on the valve stem and held from movement axially of said stem under the pressure of the coiled spring by means of a key 34 passing through the stem. The parts are assembled with the coiled spring in compressed condition so that it tends to move the valve to closed position when the valve is open and to maintain the valve in closed position when the valve is closed.

During the operation of the valve of an internal combustion engine, surges occur in the valve operating spring at a rate many times the rate of operation of the valve. For example, let it be assumed that, at an engine speed required to drive a car at 70 miles per hour, the crankshaft rotates at a speed of 3200 R. P. M. and the valve operating cam shaft at a speed of 1600 R. P. M. thereby giving the valve 1600 reciprocations per minute. It has been determined by actual tests that, with this rate of reciprocation of the valve, the surges often occur at a rate of 16,000 per minute.

As clearly shown in the drawing, the spring 28 is so formed that its coils diminish progressively in diameter from the end of the spring which is seated in the recess 30 in the cylinder block toward the other end of the spring. The damping means comprises a second coiled spring 36 arranged in co-axial telescoped relation with the coiled spring 28 and preferably located within the latter coiled spring. The spring 36 is formed from a substantially flat strip and is coiled flatwise and in a direction reverse to the coils of the spring 28. The coils of the spring 36 also diminish progressively in diameter in the same direction as the coils of the spring 28. The spring 36 is made of a size such that it will fit snugly within the larger end of the spring 28, as shown in the drawing. The spring 36 has its outer surface in a right line at every cross section of the coils, and the coils are reverse to the coils of the surrounding spring 28. This form of damping means assists in maintaining the shape of the spring 28 as it is compressed in operation.

The end portion of the spring 28 having the larger coils has the greater inertia and the larger coils are more readily compressed than the smaller coils of said spring. It has been found that the surges of the spring 28 may be effectively damped by applying the damping mechanism to the larger end portion of the spring.

Fig. 1 of the drawing shows the relative positions of the valve operating spring 28 and the damping spring 36 when the valve is closed. As the valve is opened thereby compressing the spring 28, the coils of said spring expand slightly radially of the spring and the coils in contact with the spring 36 move along said spring axially thereof relatively short distances in a direction toward the larger end of said spring. The spring 36 also is compressed to a slight degree axially by the pressure exerted on the same by the spring 28.

When the valve is operated by the spring 28 to close the same, a reverse action takes place. The coils of the spring 28 in contact with the spring 36 then move along the surface of the latter spring in a direction toward the smaller end of the spring 36 and the spring 36 expands to its former condition.

The frictional contact between the larger coils of the spring 28 and the damping spring 36 during the expansion and contraction of the spring 28 effectively damps the surges of the latter spring.

It is to be understood that, while the invention is illustrated in this application as embodied in a valve mechanism, certain features thereof are not limited to valve mechanisms but may be applied to other mechanisms having springs operated at high speed. It is also to be understood that the invention is not limited to the particular construction and arrangement of parts of the illustrated embodiment of the invention but that the construction shown herein is merely illustrative of the invention and that the invention may be embodied in other forms within the scope of the claims.

Having explained the nature and object of the invention and having specifically described a construction embodying the invention in its preferred form, what is claimed is:

1. In a valve mechanism for internal combustion engines, the combination of a valve, a spring for closing said valve comprising coils diminishing progressively in diameter from one end of the spring toward the other, and a damping means for said spring comprising a second coiled spring telescoped within the larger end of the valve spring, said damping spring being formed with its coils reverse to the coils of the valve spring and with its contact surface throughout conforming substantially to the sloping surface of a geometric right cone, thereby assisting in maintaining the shape of the valve spring as the latter is compressed in operation.

2. In a valve mechanism for internal combustion engines, the combination of a valve, a spring for closing said valve comprising coils diminishing progressively in diameter from one end of the spring toward the other, and a damping means for said spring comprising a second coiled spring telescoped within the larger end of the valve spring, said damping spring being of conical shape with its outer surface in a right line at every cross-section of the coils, and the coils of the damping spring being reverse to the coils of the valve spring.

WALTER R. GRISWOLD.